United States Patent
Suemitsu et al.

(10) Patent No.: US 7,970,076 B2
(45) Date of Patent: Jun. 28, 2011

(54) WIRELESS APPARATUS

(75) Inventors: Taisei Suemitsu, Tokyo (JP); Hiroyasu Sano, Tokyo (JP); Seiji Okubo, Tokyo (JP); Kentaro Gotou, Tokyo (JP)

(73) Assignee: Mitsubishi Electric Corporaiton, Tokyo (JP)

( * ) Notice: Subject to any disclaimer, the term of this patent is extended or adjusted under 35 U.S.C. 154(b) by 794 days.

(21) Appl. No.: 10/588,439

(22) PCT Filed: Apr. 27, 2004

(86) PCT No.: PCT/JP2004/006080
§ 371 (c)(1),
(2), (4) Date: Aug. 7, 2006

(87) PCT Pub. No.: WO2005/107086
PCT Pub. Date: Nov. 10, 2005

(65) Prior Publication Data
US 2007/0140381 A1    Jun. 21, 2007

(51) Int. Cl.
*H03K 9/00* (2006.01)
*H04L 27/00* (2006.01)

(52) U.S. Cl. ...................................... 375/316

(58) Field of Classification Search .................. 375/316, 375/317, 318, 322, 324, 329, 295, 297, 298, 375/344, 347; 455/3.02, 3.05, 422.1, 422.6, 455/20, 21, 278.1
See application file for complete search history.

(56) References Cited

U.S. PATENT DOCUMENTS

| | | | | |
|---|---|---|---|---|
| 5,594,612 A | * | 1/1997 | Henrion | 341/120 |
| 6,597,238 B1 | * | 7/2003 | Matsumoto et al. | 329/300 |
| 2002/0176364 A1 | * | 11/2002 | Nakamura et al. | 370/243 |
| 2003/0016761 A1 | * | 1/2003 | Min | 375/298 |
| 2003/0053552 A1 | * | 3/2003 | Hongo et al. | 375/295 |
| 2004/0120421 A1 | * | 6/2004 | Filipovic | 375/316 |
| 2004/0224657 A1 | * | 11/2004 | Matsusaka | 455/278.1 |
| 2005/0123079 A1 | * | 6/2005 | Yamamoto et al. | 375/344 |
| 2006/0019604 A1 | * | 1/2006 | Hasarchi | 455/15 |

FOREIGN PATENT DOCUMENTS

| | | |
|---|---|---|
| CN | 1233024 | 10/1999 |
| JP | 03-011814 | 1/1991 |
| JP | 09-219663 | 8/1997 |
| JP | 11-122311 | 4/1999 |
| JP | 2002141821 | * 10/2000 |
| JP | 2001-16121 | 1/2001 |
| JP | 2002-141821 | * 5/2002 |
| JP | 2003-264472 | 9/2003 |

* cited by examiner

*Primary Examiner* — David C. Payne
*Assistant Examiner* — Syed Haider
(74) *Attorney, Agent, or Firm* — Oblon, Spivak, McClelland, Maier & Neustadt, L.L.P.

(57) ABSTRACT

A wireless apparatus which performs a frequency conversion on a received signal with a mixer and an analog filter, and which corrects for distortion of the received signal, which occurs because the analog filter is not an ideal one, using a digital filter disables the filtering of the received signal by the digital filter when determining from the reception power level (or reception amplitude level) of the received signal that the filtering of the received signal by the digital filter will increase the distortion of the received signal.

8 Claims, 5 Drawing Sheets

- - - - - (DOTTED LINE) IDEAL BAND LIMITING
——— (SOLID LINE) BAND LIMITING BY ANALOG
BAND PASS FILTER

- - - - - (DOTTED LINE) IDEAL BAND LIMITING
——— (SOLID LINE) BAND LIMITING BY DIGITAL FILTER

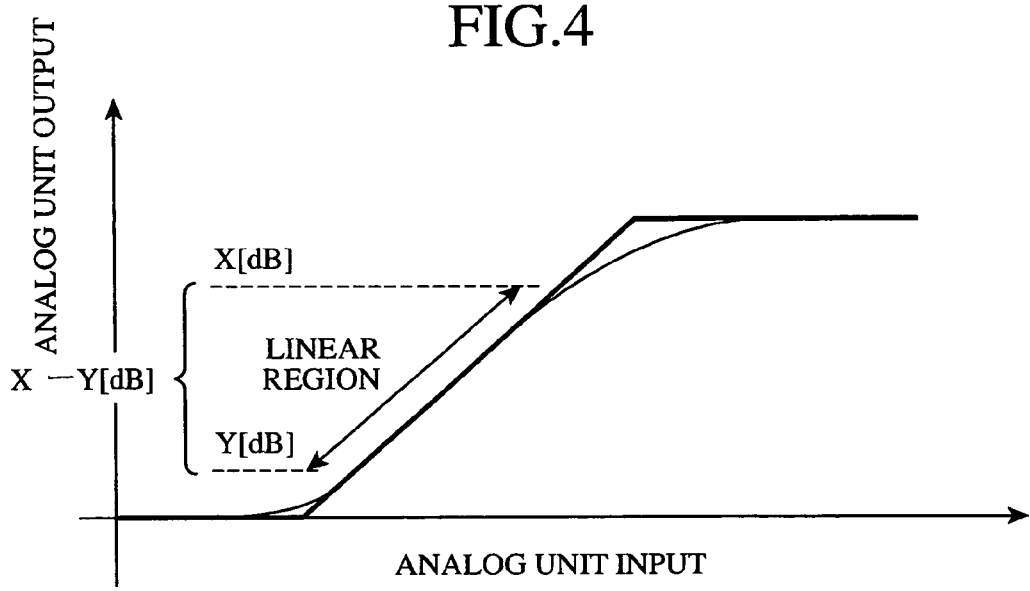
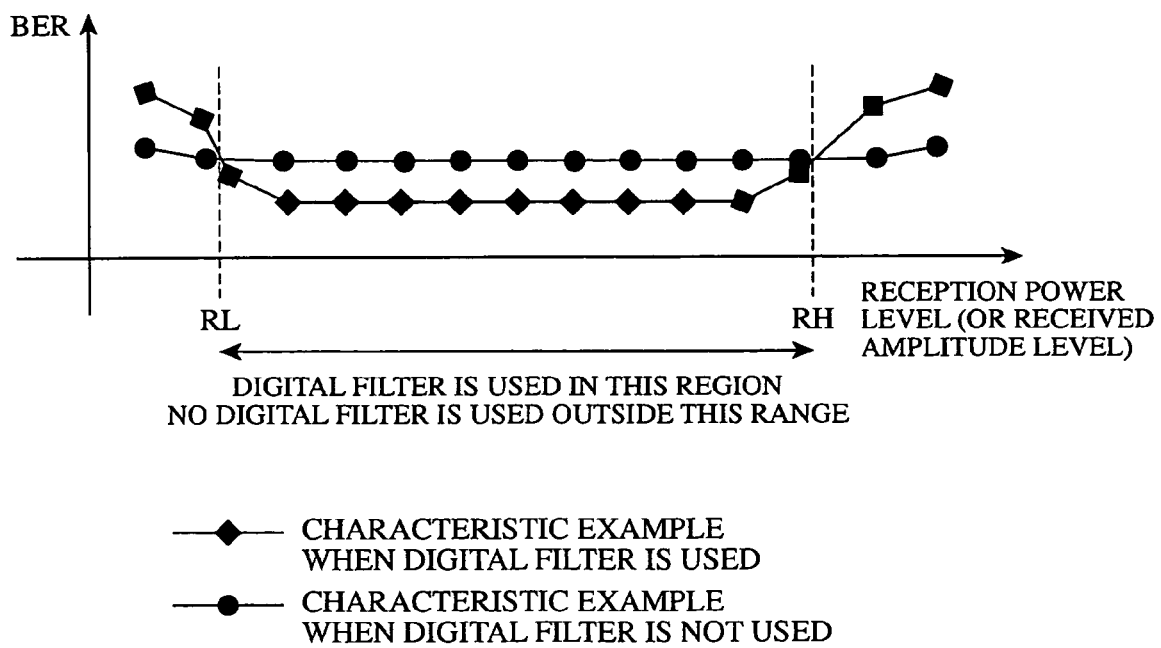

* RECEIVED AMPLITUDE LEVEL IS USED INSTEAD OF RECEPTION POWER LEVEL

| CONTROL CONDITION | DIGITAL FILTER CONTROL SIGNAL |
|---|---|
| RH ≧ RECEPTION POWER LEVEL ≧ RL | H : ON |
| RECEPTION POWER LEVEL > RH, RECEPTION POWER LEVEL < RL | L : OFF |

* RECEIVED AMPLITUDE LEVEL IS USED INSTEAD OF RECEPTION POWER LEVEL

WIRELESS APPARATUS

FIELD OF THE INVENTION

The present invention relates to a wireless apparatus which is applied to a mobile-communications base station apparatus and so on.

BACKGROUND OF THE INVENTION

In general, a carrier for use in mobile communications lies mainly within a certain band of high frequencies, such as a microwave band. On the other hand, signal processing in modulation and demodulation is carried out in a baseband in many cases in order to cut down on the cost. For this reason, base station apparatus need a circuit for converting data received in a high-frequency band into a signal in a baseband or in an intermediate frequency band. A device which functions as a band limiting filter is usually used for this frequency conversion. Such a band limiting filter is called an analog band pass filter. Since a band limiting filter is not a filter which can ideally limit the band of data passing therethrough, like a root Nyquist filter, intersymbol interference occurs in the data passing through the band limiting filter and therefore the data becomes distorted.

In order to correct for a signal which becomes distorted after passing through an analog band pass filter, there can be provided a digital filter having a band limiting characteristic which is inverse to the band limiting characteristic of the analog band pass filter with respect to an ideal filter in a base band signal processing unit. This digital filter is so constructed as to have a plurality of taps and to multiply the plurality of taps by different coefficients, respectively, and the coefficient values are chosen so that a portion in the band limiting by the analog band pass filter, which is different from the ideal band limiting, can be brought close to the ideal band limiting.

As one of prior art digital filters which are used for purposes relatively close to the above-mentioned purpose, there is a method disclosed in, for example, the following patent reference 1.

Although this method includes the step of correcting for degradation in the characteristics of an analog band pass filter due to a group delay using a digital filter disposed as a subsequent stage, the purpose of the method differs from that of a method in accordance with the present invention of correcting for degradation in the band limiting characteristic which occurs in a case of nonlinear input having a reception power level (or a received amplitude level). However, since the prior art method uses a similar means for correcting for degradation in the characteristics of an analog band pass filter using a digital filter, the prior art method will be introduced hereafter.

In the structure disclosed in this patent reference 1, a frequency conversion of a high-frequency signal received by an antenna element into a received signal having an intermediate frequency is carried out using a mixer and an analog band pass filter, a digital conversion of the received signal on which the frequency conversion has been performed into a digital signal is carried out using an A/D converter, and demodulation processing is then performed on this digital received signal by a demodulating unit. A digital filter is included in this demodulating unit, and corrects for distortion which has occurred in the signal because the analog band pass filter differs from an ideal filter such as a root Nyquist filter. The combination of the analog band pass filter and the digital filter is thus set up to provide band limiting close to such as ideal band limiting provided by a root Nyquist filter.

In addition, in the structure disclosed in this patent reference 1, an input signal and an output signal (or an A/D converted output signal) of the analog band pass filter are extracted, the characteristics of the group delay caused by the analog band pass filter are estimated using an algorithm, such as an LMS (Least Mean Squares: least square average) or an RLS (Recursive Least Squares), and a control signal is outputted to the digital filter so that a tap coefficient to be used by the digital filter is selected. Therefore, this prior art method offers an advantage of being able to correct for distortion which occurs in the signal using an optimal tap coefficient in which a group delay frequency characteristic is stored at all times. However, as a circuit which estimates the characteristics of the group delay is adapted to estimate the group delay characteristics more quickly, the circuit increases in its circuit size. On the other hand, as the circuit is downsized, the speed of estimating the group delay characteristics is reduced. When the power level (or amplitude level) of the received signal deviates from a linear region in which the characteristics of the components including the mixer, the analog band pass filter, and the A/D converter are taken into consideration, normal control cannot be performed on the digital filter according to the prior art method disclosed in patent reference 1. That is, the digital filter's adverse effect of increasing the distortion caused by the analog band pass filter instead of decreasing the distortion cannot be prevented.

In a structure disclosed by the following patent reference 2, a test signal is generated, data from a subsequent stage disposed behind a digital filter is outputted by a demodulating unit, an error rate is determined, and the tap coefficient of the digital filter is changed one by one so that the error rate is minimized. As a result, the digital filter whose error rate is the smallest is always selected during demodulation processing using a combination of an analog band pass filter and the digital filter used for correction of the analog band pass filter. However, it takes much time for the technique for minimizing the error rate while changing the tap coefficient of the digital filter to offer a guarantee that the digital filter goes into effect. Furthermore, when the power level (or amplitude level) of the received signal deviates from a linear region in which the characteristics of components including a mixer, the analog band pass filter, and an A/D converter are taken into consideration, the digital filter's adverse effect of increasing the distortion caused by the analog band pass filter instead of decreasing the distortion cannot be prevented.

[Patent reference 1] JP,2002-141821,A
[Patent reference 2] JP,11-122311,A

Since prior art wireless apparatus are constructed as mentioned above, distortion which occurs due to causes other than the fact that the analog band pass filter differs from an ideal filter, such as a root Nyquist filter, becomes dominant when the power level (or amplitude level) of the received signal is too small or too large to such an extent that the linearity of the power level cannot be maintained. A problem with prior art wireless apparatus is that in such a case, the use of the digital filter further degrades the band limiting characteristic as compared with a case where no digital filter is used.

The present invention is made in order to solve the above-mentioned problem, and it is therefore an object of the present invention to provide a wireless apparatus which can prevent a digital filter thereof from further degrading the band limiting characteristic thereof when the power level (or amplitude level) of a received signal is too small or too large to such an extent that the linearity of the power level cannot be maintained.

DISCLOSURE OF THE INVENTION

A wireless apparatus in accordance with the present invention includes a digital filter control unit which disables the filtering of a received signal by a digital filter when determining from the reception power level (or reception amplitude level) of the received signal that the filtering of the received signal by the digital filter will increase the distortion of the received signal.

Therefore, in accordance with the present invention, when determining from the reception power level of the received signal that the filtering by the digital filter will increase the distortion of the received signal, the digital filter control unit can disable the filtering of the received signal by the digital filter so as to prevent degradation in the band limiting characteristic due to the filtering by the digital filter.

BRIEF DESCRIPTION OF THE FIGURES

FIG. 4 is a characteristic diagram showing a linear region of a received signal influenced by an analog unit;

FIG. 5 is a characteristic diagram showing a change in a BER at a time when a reception power level (or a received amplitude level) is varied;

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
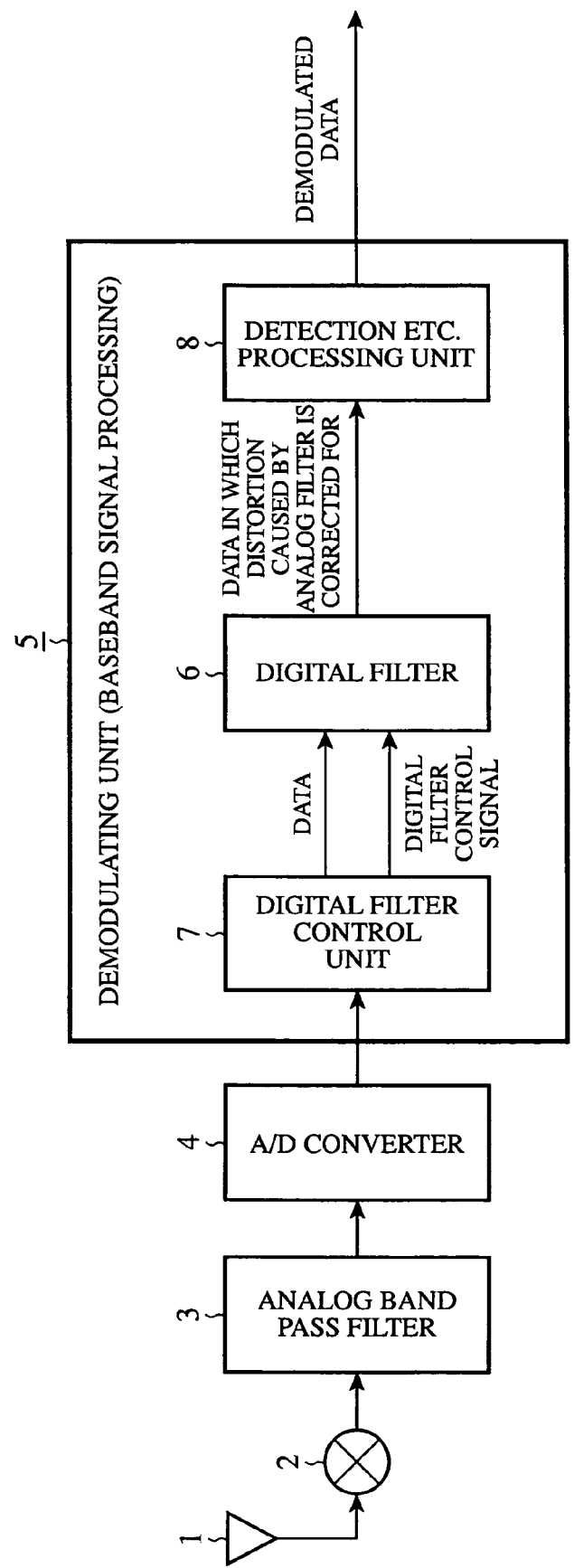
FIG. 1 is a block diagram showing a wireless apparatus in accordance with embodiment 1 of the present invention.

FIG. 1 is a block diagram showing a wireless apparatus in accordance with embodiment 1 of the present invention. In the figure, an antenna element 1 receives an electric wave, and a mixer 2 is provided with a multiplier and so on, and converts the frequency of a received high-frequency signal into a medium frequency by multiplying the received high-frequency signal received by the antenna element 1 by a local oscillation frequency or the like. An analog band pass filter (or analog filter) 3 filters the received signal whose frequency has been converted by the mixer 2 so as to extract only a signal lying within a needed frequency band. An A/D converter (analog-to-digital-conversion unit) 4 converts the analog received signal filtered by the analog band pass filter 3 into a digital signal. A demodulating unit 5 carries out a process of demodulating the received signal on which digital conversion has been performed by the A/D converter 4, and outputs demodulated data.

In this demodulating unit 5, a digital filter 6 has a band limiting characteristic which is inverse to the band limiting characteristic of the analog band pass filter 3 with respect to an ideal filter such as a root Nyquist filter, and filters the received signal which has passed through a digital filter control unit 7 mentioned below after analog-to-digital converted by the A/D converter 4 and corrects for distortion which occurs in the received signal because the analog band pass filter 3 differs from an ideal filter. The combination of the analog band pass filter 3 and digital filter 6 thus makes them have a band limiting characteristic close to that of an ideal filter such as a root Nyquist filter. When determining from the reception power level (or received amplitude level) of the received signal on which digital conversion has been performed by the A/D converter 4 that the filtering of the received signal by the digital filter 6 will increase the distortion of the received signal instead of decreasing the distortion, the digital filter control unit 7 outputs a digital filter control signal for disabling the filtering of the received signal by the digital filter 6 to cause the digital filter to make the received signal only pass therethrough without filtering it. A detection etc. processing unit 8 carries out a process of detecting the received signal passing through the digital filter 6, etc., and carries out a baseband signal process other than those carried out by the digital filter 6 and digital filter control unit 7 of the demodulating unit 5.

The wireless apparatus shown in FIG. 1 supports a single receiver. On the other hand, when the wireless apparatus is so constructed as to support a number of receivers, i.e., the wireless apparatus is adapted to be a multi-branch diversity one, what is necessary is just to provide a number of sets of an antenna element 1, a mixer 2, an analog band pass filter 3, an A/D converter 4, a digital filter 6, and a digital filter control unit 7, the number of sets being equal to the number of branches, and to make a diversity unit disposed in the detection etc. processing unit 8 carry out branch combining. When, in order to convert a high-frequency signal into a signal having an intermediate frequency, temporarily converting the high-frequency signal into a signal having an intermediate frequency and further converting the signal having an intermediate frequency into a signal having a lower intermediate frequency, a further mixer 2 and a further analog band pass filter 3 are disposed behind the first mixer 2 and first analog band pass filter 3. In this case, a local oscillation frequency by which the signal having an intermediate frequency is multiplied at the second mixer 2 differs from that of the first mixer 2, and the second analog band pass filter 3 has a lower frequency passband than the first analog band pass filter 3. When further carrying out frequency conversion twice to obtain a signal having a still lower intermediate frequency, it is necessary to provide a still further mixer 2 and a still further analog band pass filter 3.

Next, the operation of the wireless apparatus in accordance with this embodiment of the present invention will be explained.

In FIG. 1, the mixer 2 and analog band pass filter 3 convert a high-frequency signal received by the antenna element 1 into a signal having an intermediate frequency.

Figure 2:
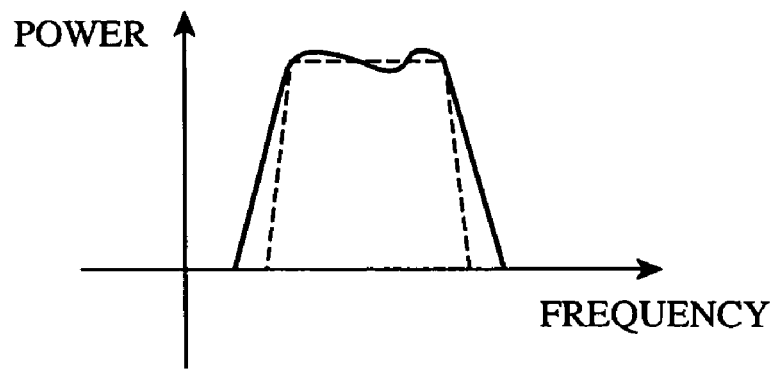
FIG. 2 is a characteristic diagram showing the ideal band limiting by an ideal filter, such as a root Nyquist filter, and the band limiting by an analog band pass filter.

FIG. 2 is a characteristic diagram showing the ideal band limiting by an ideal filter, such as a root Nyquist filter, and the band limiting by the analog band pass filter. In the figure, a dotted line shows the ideal band limiting, and a solid line shows the band limiting by the analog band pass filter. Thus, since the analog band pass filter 3 is not a filter which can carry out band limiting of data ideally like a root Nyquist filter, intersymbol interference occurs when data passes through this analog band pass filter 3 and therefore the data becomes distorted. In FIG. 2, the ideal band limiting is represented by a trapezoid. Properly speaking, the ideal band limiting has a shape which is based on a relational expression representing an ideal filter, such as a root Nyquist filter.

In FIG. 1, the received signal whose frequency has been converted into an intermediate frequency by the analog band pass filter 3 is analog-to-digital converted by the A/D converter 4.

The received signal is then demodulated in digital form by the demodulating unit 5. In the demodulating unit 5, when the received signal in digital form is furnished to the digital filter control unit 7, the digital filter control unit 7 outputs a digital filter control signal for enabling or disabling the digital filter 6 located therebehind to the digital filter 6 according to the reception power level of the received signal. Amplitude distortion which occurs in the received signal which has passed through the digital filter control unit 7 is corrected for by the digital filter 6, and the corrected received signal is then detected by the detection etc. processing unit 8. Detected data is then outputted as demodulated data.

Figure 3:
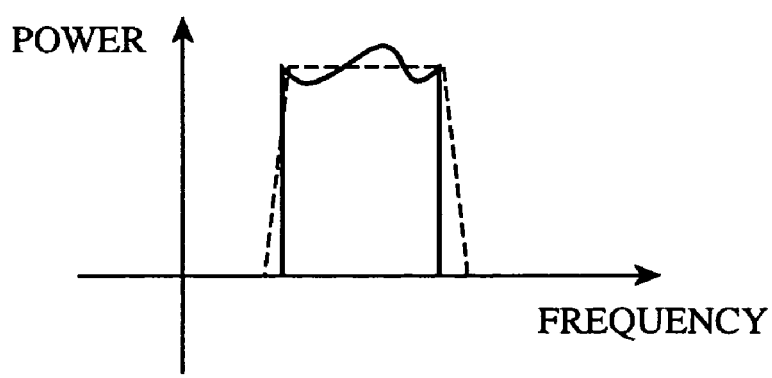
FIG. 3 is a characteristic diagram showing the ideal band limiting by an ideal filter, such as a root Nyquist filter, and the band limiting by a digital filter for correcting for amplitude distortion caused by the analog band pass filter.

FIG. 3 is a characteristic diagram showing the ideal band limiting by an ideal filter, such as a root Nyquist filter, and the band limiting by the digital filter for correcting for the amplitude distortion caused by the analog band pass filter. In the figure, a dotted line shows the ideal band limiting, and a solid line shows the band limiting by the digital filter. The digital filter has a band limiting characteristic which is inverse to the band limiting characteristic of the analog band pass filter with respect to the ideal band limiting. When data passes through the analog band pass filter 3, intersymbol interference occurs and therefore the data becomes distorted, the amplitude distortion can be corrected for since the digital filter 6 is combined with the analog band pass filter, and the coefficient of this digital filter 6 is set so that the combination exhibits a band limiting characteristic close to the ideal band limiting characteristic of an ideal filter such as a root Nyquist filter.

In FIG. 1, when the received signal has a reception power level (or received amplitude level) which falls within a region in which the linearity of the reception power level can be maintained, the digital filter control unit 7 outputs a digital filter control signal for enabling the digital filter 6 to correct for the distortion caused by the typical analog band pass filter 3. On the other hand, when the received signal has a reception power level (or received amplitude level) which does not fall within the region in which the linearity of the reception power level can be maintained, the digital filter control unit 7 outputs a digital filter control signal for disabling the digital filter 6. As a result, since the amplitude distortion caused by the analog band pass filter 3 can be corrected for only when the linearity of the reception power level of the received signal can be maintained, the level of amplitude distortion does not increase instead by virtue of the digital filter 6, and large degradation in the band limiting characteristics can be prevented.

FIG. 4 is a characteristic diagram showing a linear region of the received signal influenced by the analog unit. FIG. 4 shows the linear region of the received signal which is influenced by the analog unit including the mixer 2, analog band pass filter 3, and A/D converter 4. In FIG. 4, a region from Y[dB] to X[dB] is the linear region, and, when the output of the analog unit is less than Y[dB] or exceeds X[dB], the relation between the input and output of the analog unit is not represented by a straight line, but is represented by a curved line. In other words, the linearity of the received signal cannot be maintained when the output of the analog unit is less than Y[dB] or exceeds X[dB]. The digital filter control unit 7 only has to output a digital filter control signal according to the reception power level (or received amplitude level) of the received signal on the basis of the linearity of the characteristic diagram shown in this FIG. 4.

Even if the linearity of the reception power level (or received amplitude level) of the received signal is not maintained, if there is no increase in the degradation in the band limiting characteristic by the digital filter 6, the digital filter 6 can be enabled by changing a threshold value for the reception power level (or received amplitude level) of the received signal, the threshold value being used as a criterion by which to judge whether to enable or disable the digital filter 6.

FIG. 5 is a characteristic diagram showing a change in a BER (Bit Error Rate) at a time when the reception power level (or the received amplitude level) is varied, and shows how the BER varies according to a variation in the reception power level (or received amplitude level) in a case where the digital filter 6 is enabled and in a case where the digital filter 6 is disabled. In FIG. 5, RH indicates a linear reception power (amplitude) level high limit which corresponds to X[dB] in FIG. 4, and RL indicates a linear reception power (amplitude) level low limit which corresponds to Y[dB].

When the variation in the reception power level (or received amplitude level) lies within a linear region, the BER in the case where the digital filter 6 is enabled is better than that in the case where the digital filter 6 is disabled. On the other hand, when the variation in the reception power level (or received amplitude level) does not lie within the linear region, the BER in the case where the digital filter 6 is enabled is worse than that in the case where the digital filter 6 is disabled. In accordance with this embodiment 1, as shown in FIG. 5, the digital filter 6 is enabled when the reception power level falls within a range from the linear reception power (amplitude) level low limit (RL) to the linear reception power (amplitude) level high limit (RH), while the digital filter 6 is disabled when the reception power level is less than the linear reception power (amplitude) level low limit (RL) or exceeds the linear reception power (amplitude) level high limit (RH). Therefore, large degradation in the BER can be prevented even when the reception power level does not fall within the linear region.

As mentioned above, in accordance with this embodiment 1, when determining from the reception power level (or received amplitude level) of the received signal that the filtering by the digital filter 6 will increase the distortion of the received signal instead of decreasing the distortion, the digital filter control unit 7 can disable the filtering of the received signal by the digital filter 6 so as to prevent degradation in the band limiting characteristic due to the filtering by the digital filter 6.

In addition, since the digital filter control unit 7 can control the operation of the digital filter 6 only by checking the reception power level (or received amplitude level) of the received signal, any increase in the circuit structure of the wireless apparatus can be prevented.

In above-mentioned embodiment 1, the digital filter control unit 7 controls the operation of the digital filter 6 according to the reception power level (or received amplitude level) of the output of the A/D converter 4. The reception power level (or received amplitude level) of the received signal which is the criterion by which to judge whether to enable or disable the digital filter can be the reception power level (or received amplitude level) of the received signal which is measured at a location other than the output of the A/D converter 4. For example, the output of the analog band pass filter 3 can be used as the criterion by which to judge whether to enable or disable the digital filter.

Embodiment 2

Figures 6, 7:
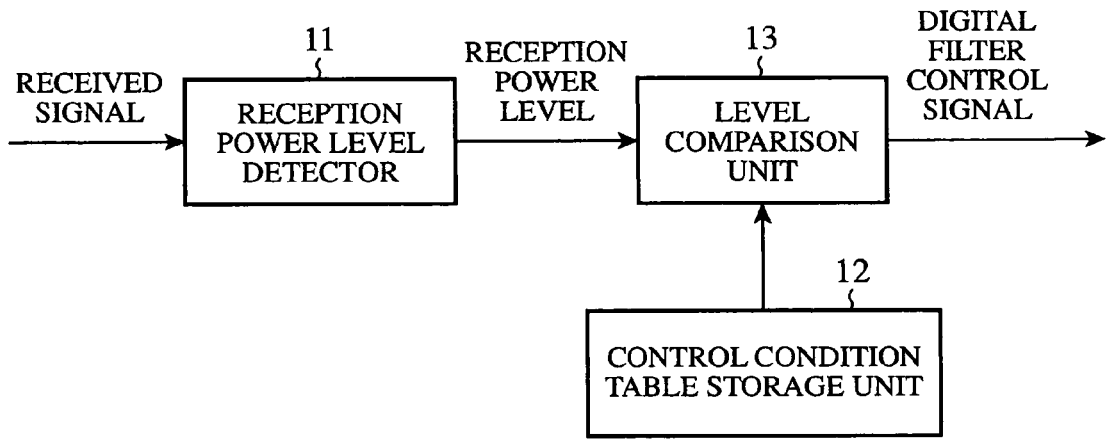
FIG. 6 is a block diagram showing the details of a digital filter control unit in accordance with embodiment 2 of the present invention.
FIG. 7 is a table diagram showing an example of a control condition table.

FIG. 6 is a block diagram showing the details of a digital filter control unit in accordance with embodiment 2 of the present invention. In the figure, a reception power (amplitude) level detector 11 detects the reception power level (or received amplitude level) of a received signal on which digital conversion has been performed by the A/D converter 4. A control condition table storage unit (i.e., a threshold storage unit) 12 is provided with a storage, such as a ROM, for storing a control condition table in which a reception power level (or received amplitude level) threshold used for enabling or disabling the filtering by the digital filter 6 is set. A level comparison unit 13 outputs a digital filter control signal for enabling or disabling the filtering of the received signal by the digital filter 6 to the digital filter 6 according to a comparison between the reception power level (or received amplitude level) detected by the reception power level (or received amplitude level) detector 11 and the reception power level (or received amplitude level) threshold of the control condition table stored in the control condition table storage unit 12. The other components of the wireless apparatus of this embodiment are the same as those shown in FIG. 1.

Next, the operation of the wireless apparatus in accordance with this embodiment of the present invention will be explained.

In FIG. 6, when the received signal on which digital conversion has been performed by the A/D converter 4 is furnished to the reception power (amplitude) level detector 11, the reception power (amplitude) level detector 11 detects the reception power level (or received amplitude level) of the received signal, and outputs the detected reception power level (or received amplitude level) to the level comparison unit 13. The level comparison unit 13 generates a digital filter control signal according to a comparison between the detected reception power level (or received amplitude level) furnished thereto and the reception power level threshold (or received amplitude level threshold) of the control condition table stored in the control condition table storage unit 12, and outputs the digital filter control signal to the digital filter 6.

FIG. 7 is a table diagram showing an example of the control condition table. As shown in this FIG. 7, when the following control condition: linear reception power (amplitude) level high limit (RH)>=reception power (amplitude) level>=linear reception power (amplitude) level low limit (RL) is satisfied, the level comparison unit generates a digital filter control signal for enabling the digital filter 6, whereas when the following control condition: reception power (amplitude) level>linear reception power (amplitude) level high limit (RH) or reception power (amplitude) level<linear reception power (amplitude) level low limit (RL) is satisfied, the level comparison unit generates a digital filter control signal for disabling the digital filter 6.

The linear reception power (amplitude) level high limit (RH) and linear reception power (amplitude) level low limit (RL) can be determined by acquiring the linear region of the reception power level (or received amplitude level) from the input/output characteristics of the A/D converter 4 and the characteristics of the mixer 2, amplifier, etc. which are used in the analog unit, and by performing a simulation using a simulator for characteristics verification into which information about the linear region, information about the characteristics of the analog band pass filter 3, and a correcting function of the digital filter 6 are incorporated. The input/output characteristics of the A/D converter 4, and the characteristics of the mixer 2, amplifier, etc. can be recognized by examining their respective data sheets and so on.

There is no necessity that RH and RL in FIG. 7 must be the linear reception power (amplitude) level high limit and linear reception power (amplitude) level low limit, respectively. As an alternative, RH and RL can be boundaries of the reception power level (or received amplitude level) where the band limiting characteristic degrades instead by virtue of the digital filter 6.

As mentioned above, in accordance with this embodiment 2, since the digital filter control unit 7 can be implemented via a simple structure including the reception power level (or received amplitude level) detector 11, control condition table storage unit 12, and level comparison unit 13, any increase in the circuit structure of the wireless apparatus can be prevented.

In addition, the linear reception power (amplitude) level high limit (RH) and linear reception power (amplitude) level low limit (RL) of the control condition table stored in the control condition table storage unit 12 can be set easily from the characteristics of the mixer 2, the characteristics of the analog band pass filter 3, and the characteristics of the A/D converter 4.

Embodiment 3

Figure 8:
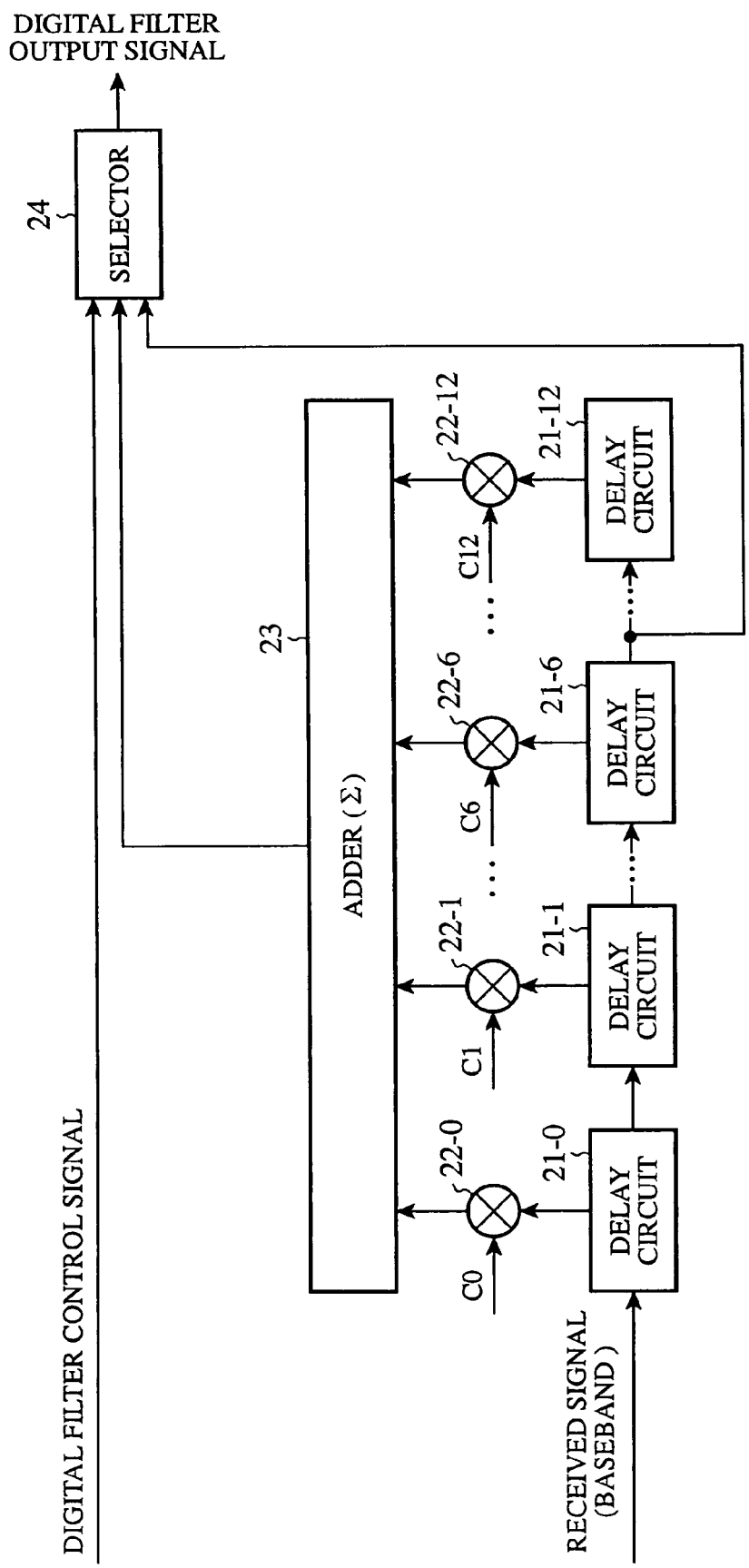
FIG. 8 is a block diagram showing the details of a digital filter in accordance with embodiment 3 of the present invention.

FIG. 8 is a block diagram showing the details of a digital filter in accordance with embodiment 3 of the present invention. In the figure, delay circuits 21-0 to 21-12 sequentially delay the digital received signal passing through the digital filter control unit 7, respectively. Multipliers 22-0 to 22-12 multiply the received signals which are respectively delayed by the delay circuits 21-0 to 21-12 by tap coefficients C0 to C12, respectively. An adder 23 calculates the sum of all the multiplication results obtained by the multipliers 22-0 to 22-12. A selector (i.e., an output selection unit) 24 selects and outputs either the summation output of the adder 23 or a delayed output from a delay circuit 21-6 according to a digital filter control signal from the digital filter control unit 7. The other components of the wireless apparatus of this embodiment are the same as those shown in FIG. 1.

Next, the operation of the wireless apparatus in accordance with this embodiment of the present invention will be explained.

In FIG. 8, a digital received signal passing through the digital filter control unit 7 is sequentially inputted and outputted to and from the delay circuits 21-0 to 21-12, and is delayed by the delay circuits, respectively. The middle delay circuit of the delay circuits 21-0 to 21-12 is the delay circuit 21-6, and the delayed outputs of the delay circuits 21-7 to 21-12 are older than the delayed output of the delay circuit 21-6 by time lengths which increase in the order of the delay circuits 21-7 to 21-12, respectively, while the delayed outputs of the delay circuits 21-5 to 21-0 are newer than the delayed output of the delay circuit 21-6 by time lengths which increase in the order of the delay circuits 21-5 to 21-0, respectively. In the digital filter 6 of this embodiment 3, the delayed output from the middle delay circuit 21-6 is furnished to the selector 24, and, when a digital filter control signal for disabling (OFF) this digital filter 6 is furnished from the digital filter control unit 7 to the digital filter, the selector 24 selects and outputs the delayed output from the delay circuit 21-6, i.e., the received signal which has not been filtered yet by the digital filter 6.

The delayed outputs of the delay circuits 21-0 to 21-12 are multiplied by the tap coefficients C0 to C12 by the multipliers 22-0 to 22-12, respectively, and the multiplication results obtained by the multipliers 22-0 to 22-12 are summed by the adder 23 and the sum of them is outputted to the selector 24. A desired correction is thus made to the digital received signal through these delay processing, multiplication processing, and summation processing, as shown in above-mentioned embodiment 1.

When a digital filter control signal for enabling (ON) this digital filter 6 is furnished from the digital filter control unit 7 to the digital filter, the selector 24 selects and outputs the summation output from the adder 23, i.e., the received signal filtered by the digital filter 6.

As mentioned above, in accordance with this embodiment 3, only addition of wiring for the digital filter control signal, wiring for the delayed output from the delay circuit 21-6 to the selector 24, and the selector 24 into a typical digital filter can implement the digital filter 6 which enables or disables the filtering of the received signal. Therefore, any increase in the circuit structure of the wireless apparatus can be prevented.

INDUSTRIAL APPLICABILITY

As mentioned above, the wireless apparatus in accordance with the present invention can be applied to a mobile-communications base station apparatus or the like which complies with a CDMA (Code Division Multiple Access: code division multiple access) or TDMA (Time Division Multiple Access: time-division multiplex) method, and is suitable for prevention of degradation in the band limiting characteristic due to the analog filter and the digital filter.

The invention claimed is:

1. A wireless apparatus comprising:
   a mixer to convert a frequency of a received signal;
   an analog filter to filter the received signal whose frequency has been converted by said mixer;
   an analog-to-digital converter to convert the received analog signal filtered by said analog filter into a digital signal;
   a digital filter having a band limiting characteristic which is inverse to that of said analog filter with respect to an ideal filter, to filter the digital signal into which the received signal has been converted by said analog-to-digital converter; and
   a digital filter control unit to disable the filtering of the digital signal by said digital filter when determining directly from non-linearity of a power level or directly from non-linearity of an amplitude level of the received signal that the filtering by said digital filter will increase distortion of the received signal, the determining occurring before the filtering of the digital signal by said digital filter.

2. The wireless apparatus according to claim 1, wherein said digital filter control unit includes
   a receive level detector to detect the receive level of the received signal,
   a threshold storage unit to store a receive level threshold which said digital filter control unit uses when disabling the filtering of the digital signal by the digital filter, and
   a level comparison unit to enable or disable the filtering of the digital signal by said digital filter according to a comparison between the receive level detected by said receive level detector and the receive level threshold stored in said threshold storage unit.

3. The wireless apparatus according to claim 2, wherein said threshold storage unit stores, as the receive level threshold which said digital filter control unit uses when disabling the filtering of the digital signal by said digital filter, a linear receive level high limit of the received signal which is influenced by an analog unit including the mixer, the analog filter, and the analog-to-digital converter.

4. The wireless apparatus according to claim 2, wherein said threshold storage unit stores, as the receive level threshold which said digital filter control unit uses when disabling the filtering of the digital signal by said digital filter, a linear receive level low limit of the received signal which is influenced by an analog unit including the mixer, the analog filter, and the analog-to-digital converter.

5. The wireless apparatus according to claim 2, wherein said threshold storage unit stores, as the receive level threshold which said digital filter control unit uses when disabling the filtering of the digital signal by said digital filter, a linear receive level high limit and a linear receive level low limit of the received signal which is influenced by an analog unit including the mixer, the analog filter, and the analog-to-digital converter.

6. The wireless apparatus according to claim 1, wherein said digital filter includes
   an output selecting unit to select and output the received signal which has been filtered by said digital filter or the received signal which has not been filtered by said digital filter according to enabling or disabling control of the filtering of the digital signal by said digital filter control unit.

7. A wireless method comprising:
   converting, in a mixer, a frequency of a received signal;
   filtering, in an analog filter, the received signal whose frequency has been converted by said mixer;
   converting, in an analog-to-digital converter, the received analog signal filtered by said analog filter into a digital signal;
   filtering, in a digital filter having a band limiting characteristic which is inverse to that of said analog filter with respect to an ideal filter, the digital signal into which the received signal has been converted by said analog-to-digital converter; and
   disabling, in a digital filter control unit, the filtering of the digital signal by said digital filter when determining directly from non-linearity of a power level or directly from non-linearity of an amplitude level of the received signal that the filtering by said digital filter will increase distortion of the received signal, the determining occurring before the filtering of the digital signal by said digital filter.

8. A wireless apparatus comprising:
   a mixer to convert a frequency of a received signal;
   an analog filter to filter the received signal whose frequency has been converted by said mixer;
   an analog-to-digital converter to convert the received analog signal filtered by said analog filter into a digital signal;
   a digital filter having a band limiting characteristic which is inverse to that of said analog filter with respect to an ideal filter, to filter the digital signal into which the received signal has been converted by said analog-to-digital converter; and
   a digital filter control unit to disable the filtering of the digital signal by said digital filter when determining directly from non-linearity of a power level of the received signal that the filtering by said digital filter will increase distortion of the received signal, the determining occurring before the filtering of the digital signal by said digital filter.

* * * * *